United States Patent
Tseng et al.

(10) Patent No.: US 12,455,657 B1
(45) Date of Patent: Oct. 28, 2025

(54) DISPLAY DEVICE AND DRIVING METHOD THEREOF

(71) Applicant: E Ink Holdings Inc., Hsinchu (TW)

(72) Inventors: Hung Wei Tseng, Hsinchu (TW); Yi Chun Kuo, Hsinchu (TW); Chen Cheng Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/769,410

(22) Filed: Jul. 11, 2024

(30) Foreign Application Priority Data

Apr. 29, 2024 (TW) .................. 113115889

(51) Int. Cl.
  *G06F 3/041* (2006.01)
  *G09G 3/34* (2006.01)
(52) U.S. Cl.
  CPC ........ *G06F 3/04184* (2019.05); *G06F 3/0412* (2013.01); *G09G 3/344* (2013.01); *G09G 2310/08* (2013.01)
(58) Field of Classification Search
  None
  See application file for complete search history.

(56) References Cited

U.S. PATENT DOCUMENTS

| | | | |
|---|---|---|---|
| 9,024,913 B1 * | 5/2015 | Jung | G09G 3/3655 345/174 |
| 9,058,075 B2 | 6/2015 | Lee et al. | |
| 10,275,089 B2 | 4/2019 | Kim et al. | |
| 10,345,575 B1 | 7/2019 | Wei et al. | |
| 10,444,901 B2 | 10/2019 | Shin | |
| 10,496,205 B2 | 12/2019 | Jung et al. | |
| 11,307,446 B2 | 4/2022 | Ahn | |
| 2015/0309624 A1 | 10/2015 | Hotelling et al. | |
| 2020/0333899 A1 | 10/2020 | Kurasawa et al. | |
| 2023/0121668 A1 | 4/2023 | Wang et al. | |

FOREIGN PATENT DOCUMENTS

| | | |
|---|---|---|
| CN | 104503173 | 4/2015 |
| CN | 104991392 | 10/2015 |
| CN | 205721708 | 11/2016 |
| CN | 107887336 | 4/2018 |
| TW | 201409436 | 3/2014 |
| TW | 201602703 | 1/2016 |

OTHER PUBLICATIONS

Office Action of Taiwan Related Application No. 112129681 issued on Aug. 9, 2024, pp. 1-5.
"Office Action of Taiwan Counterpart Application", issued on Apr. 17, 2025, p. 1-p .3.

* cited by examiner

*Primary Examiner* — Brian M Butcher
(74) *Attorney, Agent, or Firm* — JCIPRNET (57) ABSTRACT

A display device and a driving method thereof are provided. The display device includes a first electrode, a second electrode, a display medium layer, and an electrode driver. The first electrode serves as a touch electrode. The display medium layer is configured between the first electrode and the second electrode. The electrode driver is coupled to the first electrode and drives the first electrode. During a touch sensing period, the electrode driver provides a touch driving signal to the first electrode, and the first electrode performs touch sensing based on the touch driving signal. During the touch sensing period, a first average voltage value of the first electrode is equal to a second average voltage value of the second electrode.

8 Claims, 5 Drawing Sheets

DISPLAY DEVICE AND DRIVING METHOD THEREOF

CROSS-REFERENCE TO RELATED APPLICATION

This application claims the priority benefit of Taiwan application serial no. 113115889, filed on Apr. 29, 2024. The entirety of the above-mentioned patent application is hereby incorporated by reference herein and made a part of this specification.

BACKGROUND

Technical Field

The disclosure relates to a display technology, and particularly relates to a display device with a touch electrode and a driving method thereof.

Description of Related Art

The term "electro-optic" is mainly used in the context of materials or display technologies and refers to materials with first and second display states. The optical properties of the first and second display states are different from each other, and the material is transformed from the first display state to the second display state, or from the second display state to the first display state by applying an electric field to the material. Although the aforementioned optical properties are generally colors perceptible to the human eye, they may be other optical properties, such as light transmission, reflection, fluorescence, or, in the case of displays based on machine reading, false colors. The terms "bistable," "bistability" and "bistable state" refer to displays that include display elements having first and second display states. A driving signal of limited duration can be used to give a specific display element to display the first or second display state, and the display state of this display element will last at least several times (for example, at least 4 times) the aforementioned limited duration.

Touch technology has been widely used in various electronic devices, and of course it can also be applied to electro-optic display devices. The display using electrophoretic display technology among the aforementioned electro-optic display devices can also be called an electronic paper display (EPD). In the past, touch technology configures touch electrodes on electro-optic display panels, but this made the display device thicker. In order to make the electro-optic display device thinner and lighter, attempts are made to integrate the touch panel and the electro-optic display panel with each other. However, due to signal coupling and materials, touch sensing will inevitably affect the pixel data in the electro-optic display panel, thereby interfering with the display quality.

SUMMARY

Embodiments of the disclosure provides a display device and a driving method thereof, which perform touch sensing by using one of the electrodes (such as a top electrode) of the display device and prevent a touch signal from affecting a voltage of a pixel electrode on a display screen.

A display device according to an embodiment of the disclosure includes a first electrode, a second electrode, a display medium layer, and an electrode driver. The first electrode serves as a touch electrode. The display medium layer is configured between the first electrode and the second electrode. The electrode driver is coupled to the first electrode and drives the first electrode. During a touch sensing period, the electrode driver provides a touch driving signal to the first electrode, and the first electrode performs touch sensing based on the touch driving signal. Furthermore, during the touch sensing period, a first average voltage value of the first electrode is equal to a second average voltage value of the second electrode.

A driving method of a display device described in an embodiment of the disclosure is applied to a display device. The display device includes a first electrode as a touch electrode, a second electrode, and a display medium layer. The display medium layer is configured between the first electrode and the second electrode. The driving method includes the following steps. During a touch sensing period, a touch driving signal is provided to the first electrode, and the first electrode performs touch sensing based on the touch driving signal. A first average voltage value of the first electrode is equal to a second average voltage value of the second electrode.

Based on the above, the display device and the driving method thereof according to the embodiments of the disclosure use the first electrode (such as the top electrode) in the display device close to an observer as the touch electrode, and during the touch sensing period, the average voltage values of the first electrode and the second electrode in the display device are set to be the same. In other words, the embodiments of the disclosure configure an average voltage difference between the first electrode and the second electrode during the touch sensing period to be zero. Therefore, the embodiments of the disclosure can prevent the display medium layer from adjusting its display state due to fluctuations of the DC potentials on the first electrode and the second electrode, and prevent the touch signal from affecting the voltage of the pixel electrode on the display screen.

DESCRIPTION OF THE EMBODIMENTS

When a touch driving signal is provided to a touch electrode, a transmitting terminal of the touch electrode will have a DC shift, and a receiving terminal of the touch electrode is maintained at a specific DC potential. The DC potential is different from the DC potential at the transmitting terminal when sensing. When the touch electrode is integrated into a certain electrode in the display panel (for example, the touch electrode is integrated into a top electrode), a driving voltage of a pixel in a display medium layer will be affected by the DC potential and its display state will be changed unexpectedly, which in turn affects the display quality. Therefore, in the embodiment of the disclosure, average voltage values of the first electrode and the second electrode in the display panel during a touch sensing period are set to be the same, thereby preventing the display medium layer from adjusting its display state due to fluctuations of the DC potentials on the first electrode and the second electrode during the touch sensing period and affecting the display quality. Corresponding embodiments consistent with the disclosure are provided below for detailed description.

Figure 1:
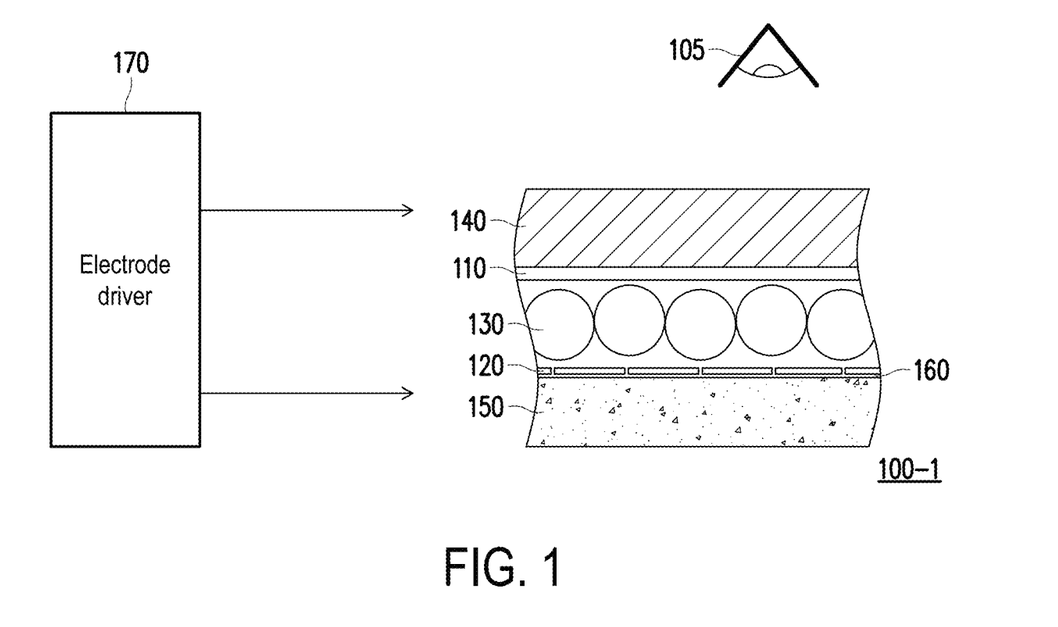
FIG. 1 is a schematic diagram of a display device according to an embodiment of the disclosure.

FIG. 1 is a schematic diagram of a display device 100-1 according to an embodiment of the disclosure. The display device 100-1 mainly includes a first electrode 110, a second electrode 120, a display medium layer 130, and an electrode driver 170. The first electrode 110 provided in the embodiment serves as a touch electrode. Based on the different implementation methods of the circuit structure, the first electrode 110 provided in the embodiment can be used as the transmitting terminal of the touch electrode (in the embodiment, "Tx" is represented as the transmitting terminal of the touch electrode), and the receiving terminal of the touch electrode can be separately disposed somewhere in the display device 100-1. In the embodiment, "Rx" is represented as the receiving terminal of the touch electrode. In the embodiment, there may be a plurality of receiving terminals Rx, which are used to determine whether touch sensing occurs in a certain area corresponding to a specific receiving terminal Rx.

The receiving terminal Rx will correspondingly generate a touch sensing signal based on the touch driving signal on the transmitting terminal Tx, and the display device 100-1 can correspondingly perform mutual capacitance touch sensing based on the touch sensing signal. In another embodiment consistent with the disclosure, the first electrode 110 provided in the embodiment can be used as the transmitting terminal Tx of the touch electrode and can also be used as the receiving terminal Rx of the touch electrode at the same time, and the display device 100-1 can correspondingly perform self capacitance touch sensing based on the touch sensing signal.

Relative to an observer 105, the first electrode 110 provided in the embodiment can be called the top electrode of the display device 100-1, and the second electrode 120 can be called the bottom electrode of the display device 100-1. The observer 105 in FIG. 1 is used to represent the user's line of sight position toward the display device 100-1.

The display medium layer 130 is configured between the first electrode 110 and the second electrode 120. In other words, the display medium layer 130 is disposed between the first electrode 110 and an active element array substrate 160. The active element array substrate 160 will be described in detail in FIG. 2. The display medium layer 130 provided in the embodiment is adapted for a display medium area in electronic paper technology. The display medium layer 130 may be an electrophoretic electronic ink layer with micro-encapsulation. The electrophoretic electronic ink has a bistable display function.

The electrode driver 170 is coupled to the first electrode 110 and drives the first electrode 110 and the second electrode 120. The electrode driver 170 provided in the embodiment is configured to provide corresponding signals to the first electrode 110 and the second electrode 120. Those who apply the embodiment can design the circuit structure of the electrode driver 170 according to their requirements. For example, the electrode driver 170 can be implemented using two different voltage supplies, in which one of the voltage supplies is dedicated to providing signals to the first electrode 110, and the other of the voltage supplies is dedicated to providing signals to the second electrode 120.

During the touch sensing period, the electrode driver 170 provided in the embodiment provides the touch driving signal to the first electrode 110, and the first electrode 110 performs touch sensing based on the touch driving signal. Moreover, during the touch sensing period, a first average voltage value of the first electrode 110 is equal to a second average voltage value of the second electrode 120. Detailed descriptions of the electrode driver 170 and the touch driving signal can be found in the following embodiments.

The display device 100-1 may further include a front substrate 140, a backplane 150, and the active element array substrate 160. The front substrate 140 is disposed close to the observer 105, and in some embodiments, a color filter array can be formed on the front substrate 140 to adjust the color displayed by the display medium layer 130. The active element array substrate 160 may be formed on the backplane 150.

Figure 2:
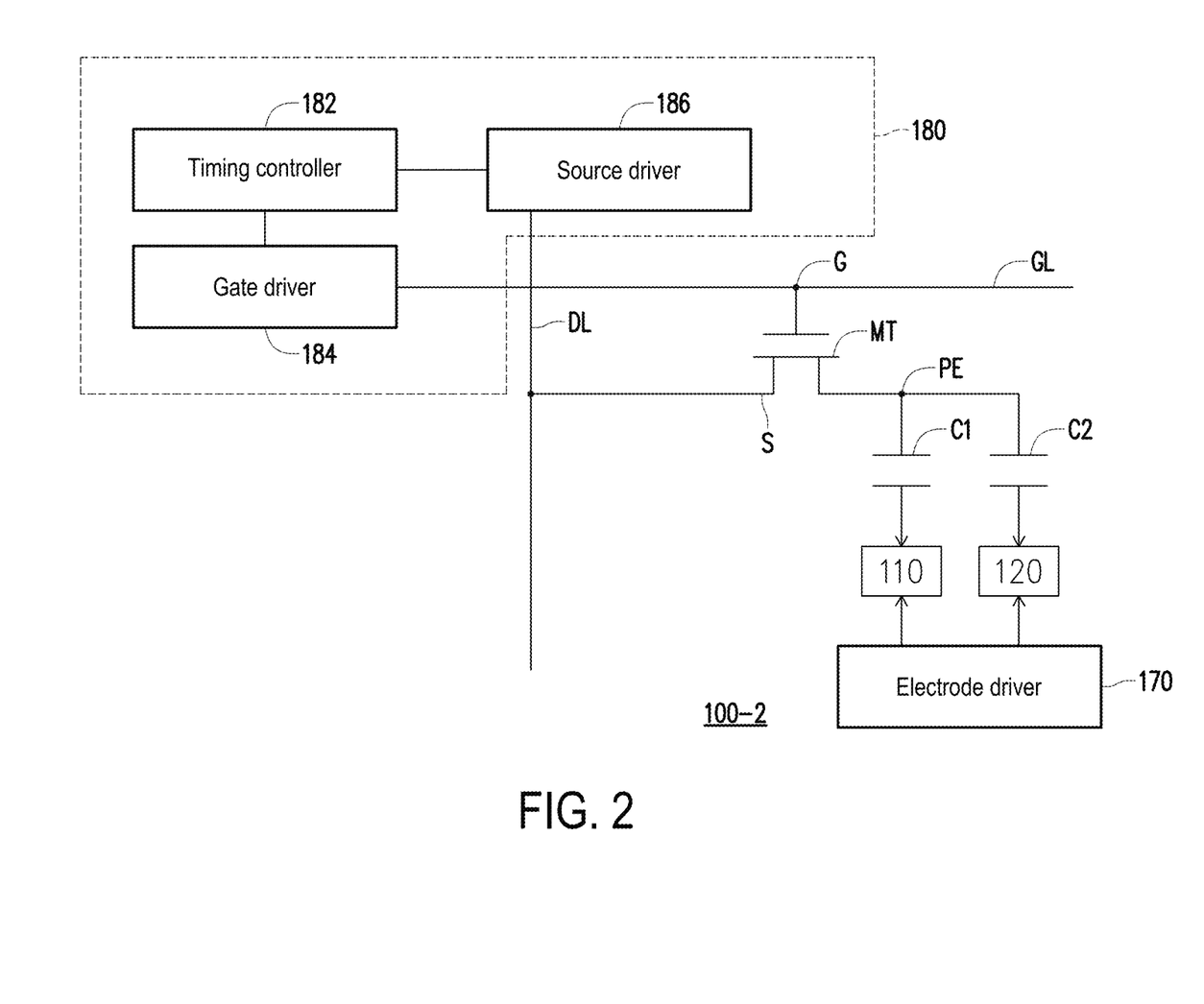
FIG. 2 is a circuit structure diagram of a display device according to an embodiment of the disclosure.

FIG. 2 is a circuit structure diagram of a display device 100-2 according to an embodiment of the disclosure. FIG. 2 mainly presents the components of the active element array substrate 160 and related circuit elements in the display device 100-2, and is complementary to the main presentation of the cross-sectional structure of the display device 100-1 in FIG. 1. In other words, those who apply the embodiment can know that the display device 100-1 in FIG. 1 and the display device 100-2 in FIG. 2 are the same.

Referring to FIG. 2, the display device 100-2 in FIG. 2 includes, in addition to the components shown in FIG. 1, a driving circuit 180 and each component of the active element array substrate 160. The active element array substrate 160 of the display device 100-2 includes a scan line GL, a data line DL, a transistor MT, a pixel electrode PE, and the second electrode 120. The transistor MT includes a gate terminal G and a source terminal S. The gate terminal G is electrically connected to the corresponding scan line GL, and the source terminal S is electrically connected to the corresponding data line DL.

The driving circuit 180 includes a timing controller 182, a gate driver 184, and a source driver 186. The driving circuit 180 provides a voltage of the pixel electrode PE to the display screen via the scan line GL and the data line DL. Specifically, FIG. 1 shows that the display medium layer 130 is configured between the first electrode 110 and the second electrode 120. A storage capacitor C2 is formed between the first electrode 110 and the pixel electrode PE. A display medium capacitor C1 is formed between the second electrode 120 and the pixel electrode PE. The embodiment uses the storage capacitor C2, the display medium capacitor C1, and the element characteristics in the display medium layer 130 to adjust the display state of each pixel, thereby adjusting the display screen.

Figure 3:
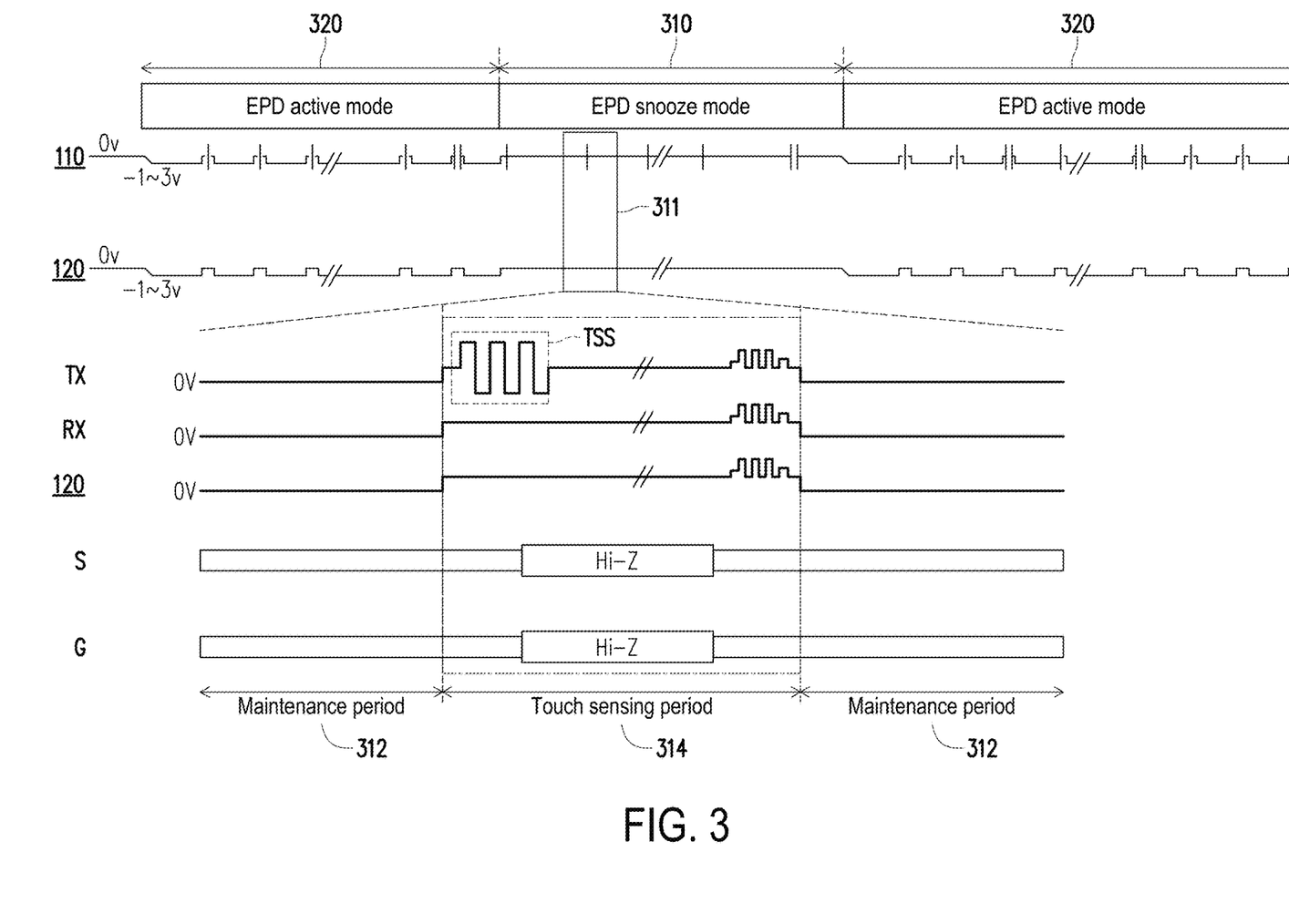
FIG. 3 is a waveform diagram of each signal in an EPD snooze mode of a display device according to an embodiment of the disclosure.
Figure 4:
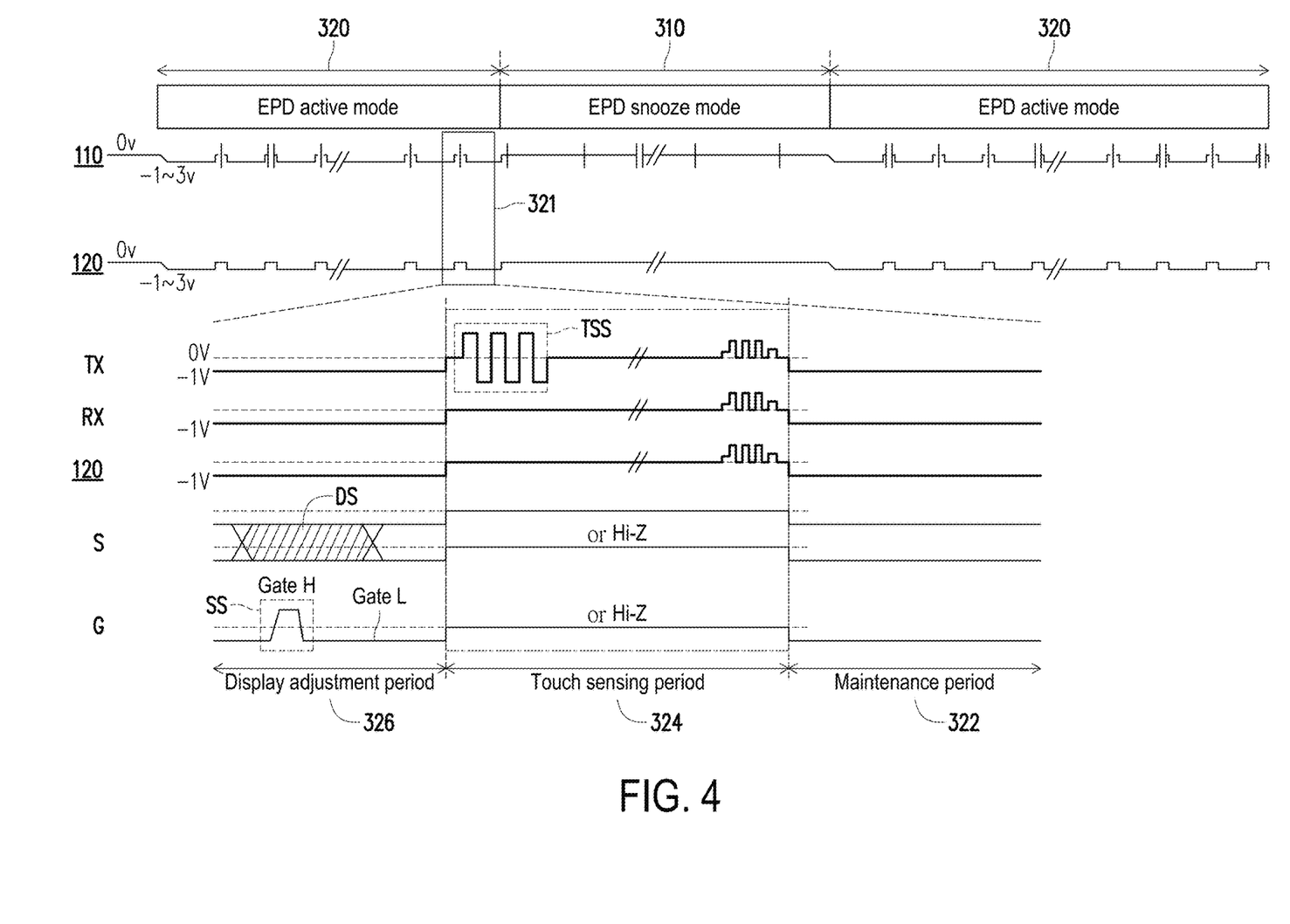
FIG. 4 is a waveform diagram of each signal in an EPD active mode of a display device according to an embodiment of the disclosure.

Distinguished according to the control mode, the display device provided in the embodiment includes an electronic paper display (EPD) active mode and an EPD snooze mode. As shown in FIG. 3, an EPD snooze mode 310 means that the display device does not change the display screen, but still has a touch function. Therefore, the EPD snooze mode 310 includes a touch sensing period 314 and a maintenance period 312. On the other hand, an EPD active mode 320 means that the display device is changing the display screen and has a touch function at the same time. Therefore, in addition to a touch sensing period 324 and a maintenance period 322, the EPD active mode 320 also has a display adjustment period 326. Here, FIG. 4 is used as an example. Both FIG. 3 and FIG. 4 take mutual capacitance touch sensing as an example, that is, the first electrode 110 serves as the transmitting terminal Tx of the touch electrode, and the receiving terminal Rx of the touch electrode is disposed separately.

FIG. 3 is a waveform diagram of each signal in the EPD snooze mode 310 in a display device according to an embodiment of the disclosure. Referring to FIG. 3, the upper part of FIG. 3 shows the waveforms of the first electrode 110 and the second electrode 120 in the EPD snooze mode 310 and the EPD active mode 320 respectively. Here, a part of a waveform 311 in the EPD snooze mode 310 is enlarged and presented in the lower part of FIG. 3.

The lower part of FIG. 3 shows the part of the waveform 311 in the EPD snooze mode 310, and the part of the waveform 311 includes the maintenance period 312 and the touch sensing period 314 that are interleaved. The maintenance period 312 and the touch sensing period 314 do not overlap with each other on the time axis.

During the touch sensing period 314, the electrode driver 170 in FIG. 1 may provide a touch driving signal TSS to the transmitting terminal Tx of the first electrode 110, and the first electrode 110 performs touch sensing based on the touch driving signal TSS. Moreover, during the touch sensing period 314, the first average voltage value of the transmitting terminal Tx in the first electrode 110 (0V as shown in FIG. 3) is equal to the second average voltage value of the second electrode 120 (0V as shown in FIG. 3), that is, equal to a first predetermined potential (0V). The average voltage value of the receiving terminal Rx in the first electrode 110 is also equal to the first predetermined potential (0V).

In another embodiment of the disclosure, the first predetermined potential can be set to other potentials, not limited to 0V. For example, those who apply the embodiment can select any potential from 0V to 2.5V as the first predetermined potential according to their requirements.

In another embodiment of the disclosure, the average voltage value of the receiving terminal Rx in the first electrode 110 is not necessarily equal to the aforementioned first predetermined potential (0V), and can also be another DC potential (such as any potential from 0V to 2.5V) which is different from the first predetermined potential.

It can be seen from FIG. 3 that although the voltage waveform on the transmitting terminal Tx during the touch sensing period 314 includes the touch driving signal TSS, the average voltage value (0V) on the transmitting terminal Tx during the touch sensing period 314 is equal to the average voltage value (0V) of the second electrode 120. That is, the average voltage difference between the first electrode 110 and the second electrode 120 during the touch sensing period 314 is zero. In the embodiment, the average voltage value (0V) on the transmitting terminal Tx during the touch sensing period 314 is also equal to the average voltage value (0V) on the receiving terminal Rx.

During the touch sensing period 314, the gate terminal G and the source terminal S of the transistor may be in a high impedance state Hi-Z. Alternatively, the gate terminal G and the source terminal S of the transistor can be maintained at the first predetermined potential (0V).

On the other hand, during the maintenance period 312, the transmitting terminal Tx of the first electrode 110, the receiving terminal Rx, and the second electrode 120 are all maintained at a second predetermined potential. The second predetermined potential in FIG. 3 is set to 0V. The source terminal S and the gate terminal G of the transistor are in the high impedance state Hi-Z. Alternatively, the gate terminal G and the source terminal S of the transistor can be maintained at the second predetermined potential (0V). The first predetermined potential and the second predetermined potential in FIG. 3 can be the same, or the two potentials can be adjusted to be different according to the requirements of the user of the embodiment.

Since the corresponding potentials in the source terminal and the gate terminal of the transistor are in a high impedance state during the EPD snooze mode 310 (as shown in FIG. 3), or the DC potentials of the source terminal and the gate terminal are both the same as the predetermined DC potential (such as 0V), the data of each pixel in the display medium layer will be maintained without being affected by the touch driving signal in the first electrode.

FIG. 4 is a waveform diagram of each signal in the EPD active mode 320 in a display device according to an embodiment of the disclosure. Referring to FIG. 4, the upper part of FIG. 4 shows the waveforms of the first electrode 110 and the second electrode 120 in the EPD snooze mode 310 and the EPD active mode 320 respectively. Here, a part of a waveform 321 in the EPD active mode 320 is enlarged and presented in the lower part of FIG. 4.

The lower part of FIG. 4 shows the part of the waveform 321 in the EPD active mode 320, and the part of the waveform 321 includes the display adjustment period 326, the touch sensing period 324, and the maintenance period 322. The display adjustment period 326, the touch sensing period 324, and the maintenance period 322 do not overlap with each other on the time axis.

During the touch sensing period 324, the electrode driver 170 in FIG. 1 may provide the touch driving signal TSS to the transmitting terminal Tx of the first electrode 110, and the first electrode 110 performs touch sensing based on the touch driving signal TSS. Moreover, during the touch sensing period 324, the first average voltage value (0V) of the transmitting terminal Tx in the first electrode 110 is equal to the second average voltage value (0V) of the second electrode 120, that is, equal to the first predetermined potential (0V). The average voltage value of the receiving terminal Rx in the first electrode 110 is also equal to the first predetermined potential (0V). In another embodiment of the disclosure, the average voltage value of the receiving terminal Rx in the first electrode 110 is not necessarily equal to the aforementioned first predetermined potential (0V), and can also be another DC potential (such as any potential from 0V to 2.5V) which is different from the first predetermined potential.

It can be seen from FIG. 4 that although the voltage waveform on the transmitting terminal Tx during the touch sensing period 324 includes the touch driving signal TSS, the average voltage value (0V) on the transmitting terminal Tx during the touch sensing period 324 is equal to the average voltage value (0V) of the second electrode 120 and is even equal to the average voltage value (0V) on the receiving terminal Rx. That is, the average voltage difference between the first electrode 110 and the second electrode 120 during the touch sensing period 324 is zero.

During the touch sensing period 324 in FIG. 4, the gate terminal G and the source terminal S of the transistor may be maintained at the first predetermined potential (0V). Alternatively, the gate terminal G and the source terminal S of the transistor may be in the high impedance state Hi-Z.

During the maintenance period 322, the transmitting terminal Tx of the first electrode 110, the receiving terminal Rx, and the second electrode 120 are all maintained at the second predetermined potential. The second predetermined potential in FIG. 4 is set to −1V. Those who apply the embodiment can set the second predetermined potential to any potential from −1V to −3V according to their requirements. The source terminal S and the gate terminal G of the transistor may be the aforementioned second predetermined potential (as shown in FIG. 4).

During the display adjustment period 326, the DC potentials of the transmitting terminal Tx of the first electrode, the receiving terminal Rx, and the second electrode 120 are maintained at the second predetermined potential (−1V). The gate terminal G of the transistor is supplied with a scan signal SS, and the source terminal S is supplied with a data signal DS to adjust the display state of each pixel, thereby adjusting the display screen.

Since during the touch sensing period 324 and the maintenance period 322, the corresponding potentials in the source terminal and the gate terminal of the transistor are in a high impedance state or are the same as the second predetermined DC potential (−1V) (as shown in FIG. 4), the data of each pixel in the display medium layer will be maintained during the touch sensing period 324 and the maintenance period 322 without being affected by the touch driving signal TSS.

Figure 5:
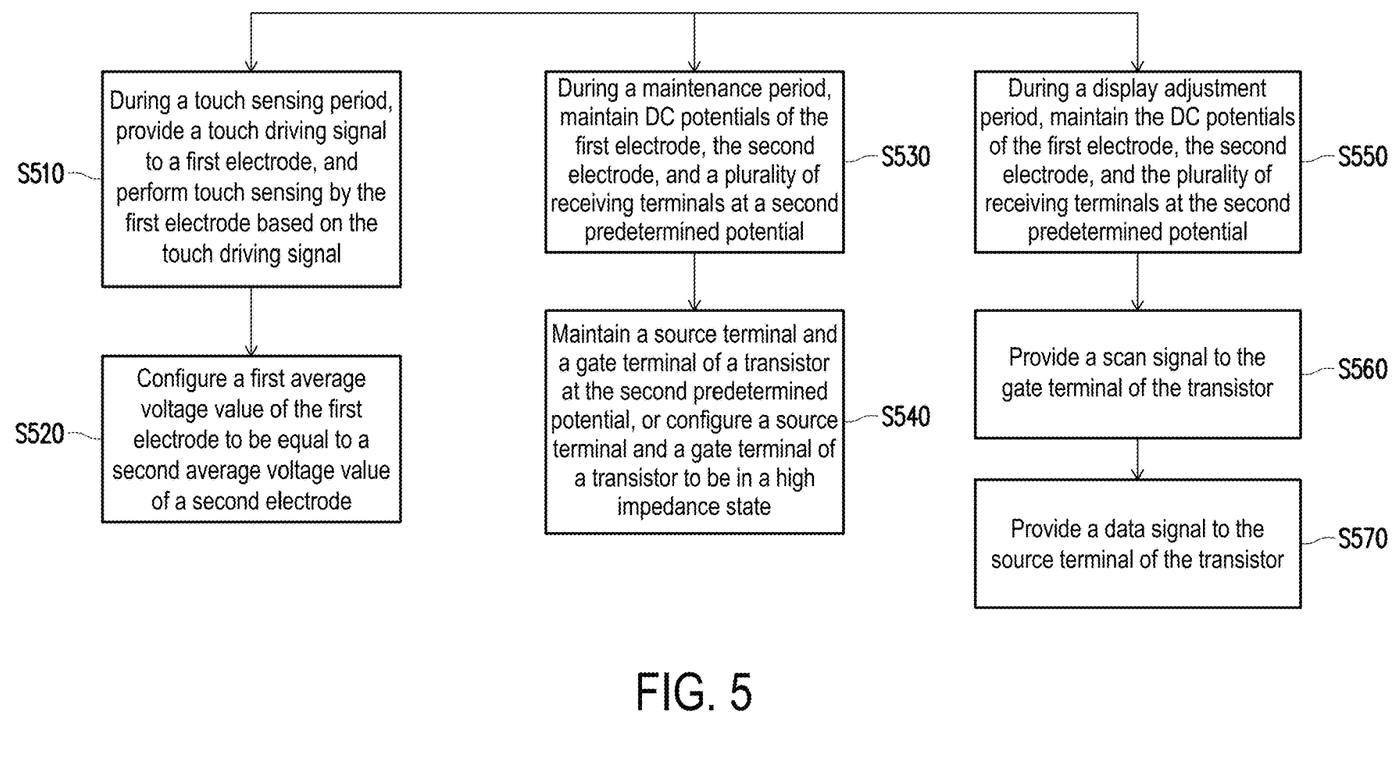
FIG. 5 is a flowchart of a driving method of a display device according to an embodiment of the disclosure.

FIG. 5 is a flowchart of a driving method of a display device according to an embodiment of the disclosure. The driving method is adapted for the display device described in FIG. 1 and FIG. 2. The display devices 100-1 and 100-2 include the first electrode 110 as the touch electrode, the second electrode 120, and the display medium layer 130, and the display medium layer 130 is configured between the first electrode 110 and the second electrode 120. Referring to FIG. 1, FIG. 2, and FIG. 5, in step S510, during the touch sensing period, the electrode driver 170 provides the touch driving signal to the first electrode 110, and the first electrode 110 performs touch sensing based on the touch driving signal. In step S520, the electrode driver 170 configures the first average voltage value of the first electrode 110 to be equal to the second average voltage value of the second electrode 120.

In step S530, during the maintenance period that is not the touch sensing period, the electrode driver 170 maintains the DC potentials of the first electrode 110, the second electrode 120, and the plurality of receiving terminals Rx at the second predetermined potential. In step S540, the source terminal S and the gate terminal G of the transistor are maintained at the second predetermined potential, or the source terminal S and the gate terminal G of the transistor are in a high impedance state.

In step S550, during the display adjustment period that is not the touch sensing period and not the maintenance period, the electrode driver 170 maintains the DC potentials of the first electrode 110, the second electrode 120, and the plurality of receiving terminals Rx at the second predetermined potential. In step S560, the scan signal is provided to the gate terminal G of the transistor. In step S570, the data signal is provided to the source terminal S of the transistor. For the detailed processes and operations of steps S510 to S570, please refer to the above embodiments.

To sum up, the display device and the driving method thereof according to the embodiments of the disclosure use the first electrode (such as the top electrode) in the display device close to the observer as the touch electrode, and during the touch sensing period, the average voltage values of the first electrode and the second electrode in the display device is set to be the same. In other words, the embodiments of the disclosure configure the average voltage difference between the first electrode and the second electrode during the touch sensing period to be zero. Therefore, the embodiments of the disclosure prevent the display medium layer from adjusting its display state due to fluctuations of the DC potentials on the first electrode and the second electrode, and prevent the touch signal from affecting the voltage of the pixel electrode on the display screen.

What is claimed is:

1. A display device, comprising:
   a first electrode, serving as a touch electrode;
   a second electrode;
   a display medium layer, configured between the first electrode and the second electrode; and
   an electrode driver, coupled to the first electrode, and configured to drive the first electrode,
   wherein during a touch sensing period, the electrode driver provides a touch driving signal to the first electrode, and the first electrode performs touch sensing based on the touch driving signal,
   wherein during the touch sensing period, a first average voltage value of the first electrode is equal to a second average voltage value of the second electrode,
   wherein the display device further comprises:
      an active element array substrate, wherein the active element array substrate comprises:
         a scan line;
         a data line;
         a transistor, wherein the transistor comprises a gate terminal and a source terminal, the gate terminal is electrically connected to the corresponding scan line, and the source terminal is electrically connected to the corresponding data line;
         a pixel electrode, electrically connected to the transistor; and
         the second electrode, configured to form a storage capacitor with the pixel electrode,
      wherein the display medium layer is configured between the first electrode and the active element array substrate.

2. The display device according to claim 1, further comprising:
   a driving circuit, coupled to the scan line and the data line, wherein the driving circuit provides a voltage of the pixel electrode to a display screen via the scan line and the data line.

3. The display device according to claim 1, wherein a potential of the second electrode is maintained at the second average voltage value during the touch sensing period.

4. The display device according to claim 1, wherein the first average voltage value and the second average voltage value during the touch sensing period are a first predetermined potential, and the source terminal and the gate terminal of the transistor are maintained at the first predetermined potential, or the source terminal and the gate terminal of the transistor are in a high impedance state;
   wherein during a maintenance period that is not the touch sensing period, DC potentials of the first electrode, the second electrode, and a plurality of receiving terminals are maintained at a second predetermined potential;
   wherein during the maintenance period, the source terminal and the gate terminal of the transistor are maintained at the second predetermined potential, or the source terminal and the gate terminal of the transistor are in the high impedance state.

5. The display device according to claim 4, wherein during a display adjustment period that is not the touch sensing period and not the maintenance period, the DC potentials of the first electrode, the second electrode, and the plurality of receiving terminals are maintained at the second predetermined potential, the gate terminal of the transistor is provided with a scan signal, and the source terminal is provided with a data signal.

6. A driving method of a display device, wherein the display device comprises a first electrode serving as a touch electrode, a second electrode, and a display medium layer, and the display medium layer is configured between the first electrode and the second electrode, the driving method comprising:

during a touch sensing period, providing a touch driving signal to the first electrode, and performing touch sensing by the first electrode based on the touch driving signal; and configuring a first average voltage value of the first electrode to be equal to a second average voltage value of the second electrode, wherein the display device further comprises an active element array substrate, and the active element array substrate comprises a scan line, a data line, a transistor, a pixel electrode, and the second electrode, wherein the transistor comprises a gate terminal and a source terminal, the gate terminal is electrically connected to the corresponding scan line, and the source terminal is electrically connected to the corresponding data line, wherein the pixel electrode is electrically connected to the transistor, and the second electrode and the pixel electrode form a storage capacitor, wherein the display medium layer is configured between the first electrode and the active element array substrate.

7. The driving method according to claim 6, wherein the first average voltage value and the second average voltage value during the touch sensing period are a first predetermined potential, and the source terminal and the gate terminal of the transistor are maintained at the first predetermined potential, or the source terminal and the gate terminal of the transistor are in a high impedance state, the driving method also further comprising:

during a maintenance period that is not the touch sensing period, maintaining DC potentials of the first electrode, the second electrode, and a plurality of receiving terminals at a second predetermined potential; and during the maintenance period, maintaining the source terminal and the gate terminal of the transistor at the second predetermined potential, or configuring the source terminal and the gate terminal of the transistor to be in a high impedance state.

8. The driving method according to claim 7, further comprising:

during a display adjustment period that is not the touch sensing period and not the maintenance period, maintaining the DC potentials of the first electrode, the second electrode, and the plurality of receiving terminals at the second predetermined potential;

providing a scan signal to the gate terminal of the transistor; and providing a data signal to the source terminal of the transistor.

* * * * *